(No Model.)
F. J. NOECHEL.
DEVICE FOR TRANSMITTING POWER.
No. 592,435. Patented Oct. 26, 1897.
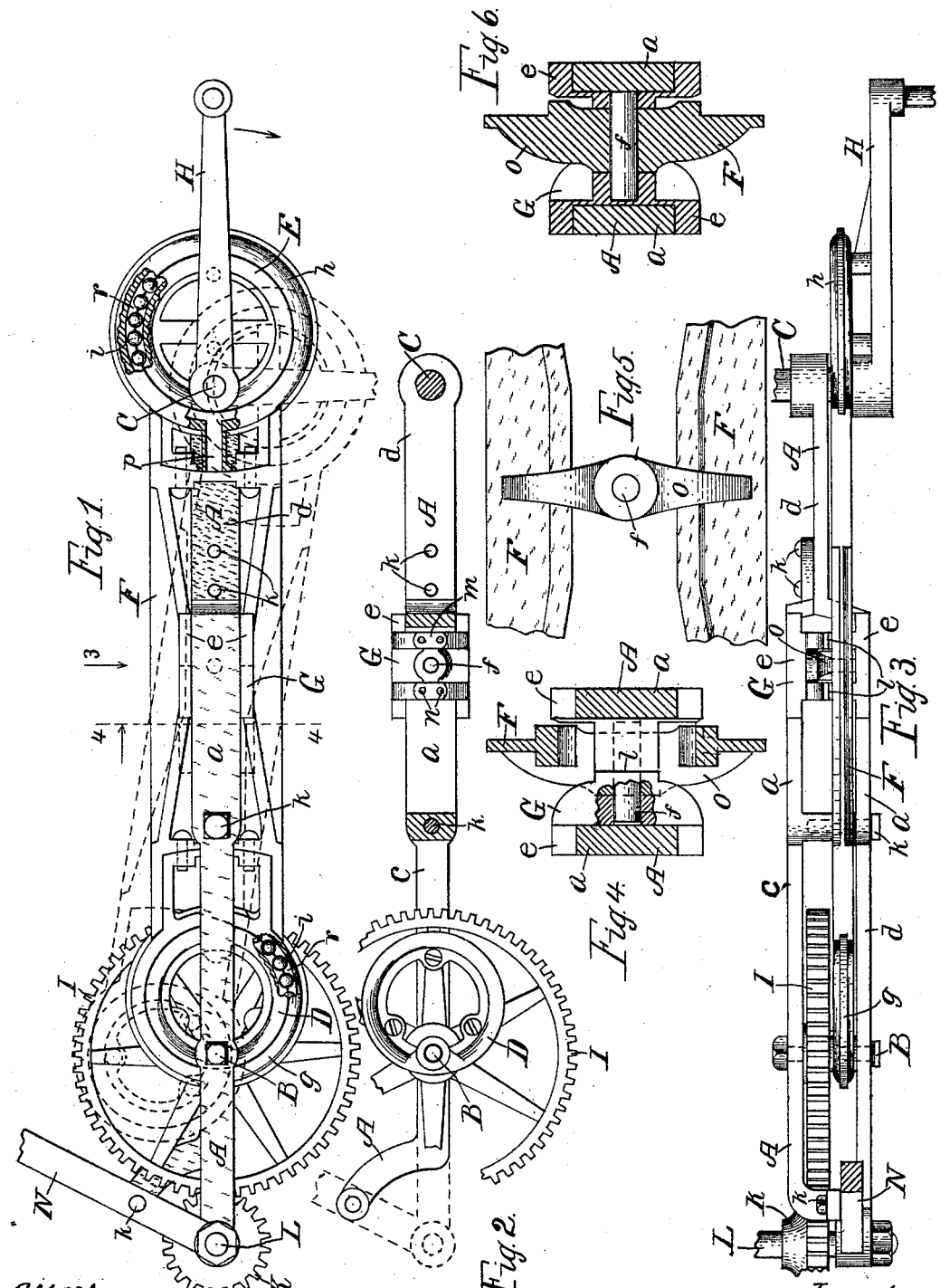
Attest:
M. L. Winston
M. D. Phillips
Inventor:
F. J. Noechel,
By E. B. Whitmore,
Atty.

UNITED STATES PATENT OFFICE.

FRANK J. NOECHEL, OF ROCHESTER, NEW YORK, ASSIGNOR TO JOHN GEORGE WAGNER, JR., AND HERMAN S. SEARLE, OF SAME PLACE.

DEVICE FOR TRANSMITTING POWER.

SPECIFICATION forming part of Letters Patent No. 592,435, dated October 26, 1897.

Application filed November 27, 1896. Serial No. 613,627. (No model.)

*To all whom it may concern:*

Be it known that I, FRANK J. NOECHEL, of Rochester, in the county of Monroe and State of New York, have invented a new and useful Improvement in Devices for Transmitting Power, which improvement is fully set forth in the following specification and shown in the accompanying drawings.

My invention relates to devices for transmitting motion or power from one shaft or revolving part to another; and the main object of the invention is to provide means for transmitting by revolutions such motion or power without the use of chains, belts, or intermediate gearing commonly used for the purpose.

A further object of my invention is to so construct and arrange the operating parts that there shall be no dead-centers or points in a revolution where the power is momentarily ineffective.

The invention consists in providing an eccentric-bearing for the driving-shaft or revolving part and a similar eccentric-bearing for the driven part and a pivotal connector for the eccentric-bearings whereby when the driving part is made to revolve by any means the driven part will also revolve in the same time and in the opposite direction.

The invention is hereinafter fully described and more particularly pointed out.

Referring to the drawings, Figure 1 is a side elevation of the device, parts being broken away and other parts shown in various positions by full and dotted lines. Fig. 2 is a similar view with many parts omitted, the frame being in longitudinal section. Fig. 3 is an edge view of the device, seen as indicated by arrow 3 in Fig. 1. Fig. 4 is a transverse section on the dotted line 4 4 in Fig. 1, viewed as indicated by arrow pointed on the line. Fig. 5 is a side elevation of the middle part of the connector. Fig. 6 is a transverse section through the axis of the driver. Figs. 4, 5, and 6 are drawn to a scale larger than that of the other figures.

Referring to the figures, A is a metal frame for supporting the other parts, it being composed of a long member $d$ and a short member $c$, held side by side by simple fasteners $k$. A rotary driving shaft or axle C is held transversely at one end of the frame, provided with an operating-crank H.

B is another shaft or axle held transversely at or near the other end of the frame to be operated by the driving-crank H. The axes of the shafts or axles C and B are parallel and in the same plane. The shaft C is provided with an eccentric-bearing E, and the shaft or axle B is similarly provided with an eccentric-bearing D, both bearings being preferably in the same plane perpendicular to the axes of the axles C and B.

F is a connector for the bearings D and E, provided with a central sliding head G, adapted to move longitudinally along parallel parts $a\,a$ of the frame and between the two members thereof, as shown. The sliding head is formed of two parts $e\,e$, joined, between which the connector is pivoted upon a transverse pin $f$, Fig. 6, the axis of which pin is parallel with the axes of the axles B and C. The parts of the sliding head meet between the members of the frame at the line $l$, Figs. 3 and 4, one of the meeting faces of the parts being shown at $m$, Fig. 2. Simple screws or pins $n\,n$ are employed to hold the parts of the head together. The connector F is in the form of an open frame or truss, and it has a middle tie or cross-bar $o$, Figs. 4, 5, and 6, crossing the space between the joined parts of the sliding head, as shown. By means of this construction the connector may have both a sliding and a rocking motion.

The connector is joined to the eccentric-bearings D and E, respectively, by means of rings or end pieces $g\,h$, held at the ends of said connector. These end pieces may be joined to the main central part of the connector by any convenient means, or the connector as a whole may be made in a single piece. It is more convenient, however, to make the end pieces separate, as shown, and join them to the main piece. It is preferable in most cases to supply the bearings with balls $i$, as shown in Fig. 1, for the purpose of decreasing the friction between the parts.

By means of the sliding head G and the pivot-pin $f$, joining it with the connector F at the middle of the latter, the middle part of the connector is controlled and held to move backward and forward in a right line between the eccentric-bearings D and E; but the ends of the connector turn in circles during the operation of the parts. This pivotal motion of the connector effectually prevents the occurrence of what is known as "dead-centers," which usually attend machines in which rotary and reciprocal parts join.

When the driving-crank H is horizontal, as shown in Fig. 1, and the parts are all in line, the connector F will act momentarily purely as a lever of the first order if the crank is carried downward, but this lever action of the connector will decline as the crank moves downward until the latter stands vertically downward, as shown by dotted lines. When this position of the crank is reached, the connector no longer acts as a lever, but acts to deliver a direct endwise push or thrust against the bearing D; but as the crank moves onward the thrust pressure or action of the connector immediately commences to decline and wholly disappears when the crank comes again in line with the other parts with its free end directed toward the axle B. At this time the connector again acts as a lever of the first order, which characteristic wholly disappears again when the crank assumes a vertical upward position. At this point the action of the connector is to exert for a moment a direct endwise pull upon the bearing D, which pull declines as the crank moves onward, and disappears wholly when the crank reaches its original horizontal position. (Shown in full lines in Fig. 1.) That is to say, at the beginning of the first quarter of a revolution the connector acts as a lever, at the beginning of the second quarter it acts to deliver a direct push, at the beginning of the third quarter it again acts as a lever, and at the beginning of the fourth quarter it exerts a direct pull. In every case, when the crank moves from the beginning of any quarter of a revolution to the beginning of the next succeeding quarter the particular action of the connector at the former quarter will gradually merge into the particular action of the connector incident to the latter quarter. From this description it will be seen that there is no point in a complete revolution of the driver in which a dead-center can occur. The action of the driver upon the driven part is continuously effectual throughout a complete revolution. The pivotal action of the connector—that is to say, its action as a lever—at the two points in a revolution where dead-centers only could occur effectually prevents their occurrence. It is of course not essential how or by what means the driver is turned, whether by a crank, gearing, or other means, and it is also evident that any device may be connected with the driven axle, according to the use to which the device may be put or the work to be done. As shown, a spur-gear I is made rigid with the bearing D. Also a pinion K is shown in mesh with the gear, the pinion being rigid with the shaft L, which may be, for example, the axle of the rear wheel of a bicycle, the crank H serving as a pedal-crank for the vehicle. In this use the upturned part N of the frame corresponds with the rear fork of the bicycle, and the ordinary sprocket-wheels and chain are dispensed with.

The antifriction-balls $i$ are introduced into the ball-races $r$ of the bearings through openings in the end pieces $g$ and $h$, one of which openings is shown at $p$, Fig. 1. The openings communicate with the respective races, and when the end pieces are secured to the main part of the connector said openings are closed by the presence of the main part so the balls cannot escape.

I claim—

1. In a device for transmitting power, the combination, with a two-part frame, the central portion of which is provided with parallel parts, and one of the parts of the frame is longer than the other, of a shaft journaled at each end of the frame, an eccentric upon each shaft, a head upon the parallel portion of the frame, and a connector pivotally secured to the head and having its ends connected with the eccentrics, substantially as set forth.

2. In a device for transmitting power, the combination, with a two-part frame, the longer part of which is provided at one end with a projection, and the end of the shorter part is secured thereto, a shaft journaled at each end of the frame, an eccentric upon each shaft, a head upon the frame, a connector pivotally secured to the head and having its ends connected with the eccentrics, substantially as set forth.

3. In a device for transmitting power, the combination, with a two-part frame, the central portion of which is provided with a parallel portion, of a shaft at each end of the frame provided with an eccentric, a two-part head between the parts of the frame, each part of which is provided with means for engaging with the parallel portions of the frame, a pin in the head, an open frame-connector provided with a cross-bar pivotally secured upon the pin, the ends of the connector being connected with the eccentrics, substantially as set forth.

4. In a device for transmitting power, the combination, with a frame, of a shaft journaled at each end thereof, an eccentric upon each shaft, a head upon the central portion of the frame, a connector pivotally secured to the head and having its ends connected with the eccentrics, each end of the connector having an opening leading into the space between the eccentrics and the connectors, and balls within the space, substantially as set forth.

In witness whereof I have hereunto set my hand this 24th day of November, 1896, in the presence of two subscribing witnesses.

FRANK J. NOECHEL.

Witnesses:
ENOS B. WHITMORE,
M. L. WINSTON.